US011528669B2

(12) United States Patent
Shen

(10) Patent No.: US 11,528,669 B2
(45) Date of Patent: Dec. 13, 2022

(54) METHOD FOR REPORTING POWER HEADROOM, METHOD FOR RECEIVING POWER HEADROOM, USER EQUIPMENT, BASE STATION, MEDIUM AND SYSTEM

(71) Applicant: SPREADTRUM COMMUNICATIONS (SHANGHAI) CO., LTD., Shangahi (CN)

(72) Inventor: Xingya Shen, Shanghai (CN)

(73) Assignee: SPREADTRUM COMMUNICATIONS (SHANGHAI) CO., LTD., Shangahi (CN)

( * ) Notice: Subject to any disclaimer, the term of this patent is extended or adjusted under 35 U.S.C. 154(b) by 176 days.

(21) Appl. No.: 16/961,807

(22) PCT Filed: Dec. 27, 2018

(86) PCT No.: PCT/CN2018/124137
§ 371 (c)(1),
(2) Date: Jul. 13, 2020

(87) PCT Pub. No.: WO2019/137222
PCT Pub. Date: Jul. 18, 2019

(65) Prior Publication Data
US 2021/0076336 A1 Mar. 11, 2021

(30) Foreign Application Priority Data
Jan. 12, 2018 (CN) .......................... 201810033669.9

(51) Int. Cl.
*H04W 52/36* (2009.01)
*H04W 72/04* (2009.01)
*H04W 52/14* (2009.01)

(52) U.S. Cl.
CPC ..... *H04W 52/365* (2013.01); *H04W 72/0446* (2013.01); *H04W 52/146* (2013.01); *H04W 72/0473* (2013.01)

(58) Field of Classification Search
CPC ........... H04W 52/365; H04W 72/0446; H04W 52/146; H04W 72/0473; H04W 52/38;
(Continued)

(56) References Cited

U.S. PATENT DOCUMENTS

2013/0044831 A1  2/2013 Narasimha et al.
2013/0114505 A1  5/2013 Haim et al.
(Continued)

FOREIGN PATENT DOCUMENTS

CN  102647800 A  8/2012
CN  103931242 A  7/2014
(Continued)

OTHER PUBLICATIONS

HiSilicon Huawei, "PHR reporting in different TTI lengths", 3GPP TSG-RAN WG2 Meeting #99b, R2-1711433; Prague, Czech Republic, Oct. 9-13, 2017; 3 pages.
(Continued)

*Primary Examiner* — Jae Y Lee
*Assistant Examiner* — Aixa A Guadalupe Cruz
(74) *Attorney, Agent, or Firm* — Cantor Colburn LLP

(57) ABSTRACT

Method for reporting power headroom, method for receiving power headroom, user equipment, base station, medium and system are provided. The method for reporting power headroom includes: determining a first carrier and a first time slot corresponding to the first carrier for transmitting a PHR; acquiring a first time slot group corresponding to at least one other carrier, wherein the first time slot group includes N time slots, uplink data transmission is performed in at least one of the N time slots, N is a positive integer, and the first
(Continued)

time slot includes the first time slot group in a time domain; generating the PHR based on power headroom corresponding to die first time slot and power headroom corresponding to the first time slot group; reporting the PHR to a base station using the first time slot. Power headroom corresponding to different carriers may be accurately reported to the base station.

10 Claims, 3 Drawing Sheets

(58) Field of Classification Search
CPC ...... H04W 24/10; H04L 5/001; H04L 5/0053; H04L 5/0094
See application file for complete search history.

(56) References Cited

U.S. PATENT DOCUMENTS

| | | | |
|---|---|---|---|
| 2015/0304966 A1* | 10/2015 | Park | H04W 80/02 370/252 |
| 2016/0014794 A1 | 1/2016 | Wu | |
| 2018/0092051 A1* | 3/2018 | Dinan | H04W 52/365 |
| 2018/0279339 A1* | 9/2018 | Löhr | H04W 52/34 |
| 2019/0098622 A1 | 3/2019 | Lee et al. | |
| 2020/0145936 A1* | 5/2020 | Lee | H04W 52/42 |
| 2020/0288412 A1* | 9/2020 | Ajdakple | H04W 80/02 |
| 2020/0305148 A1* | 9/2020 | Niu | H04W 72/042 |

FOREIGN PATENT DOCUMENTS

| | | |
|---|---|---|
| CN | 104025675 A | 9/2014 |
| WO | 2012024338 A1 | 2/2012 |
| WO | 2017173177 A1 | 10/2017 |
| WO | 2018209840 A1 | 11/2018 |

OTHER PUBLICATIONS

International Search Report for International Application No. PCT/CN2018/124137, dated Mar. 15, 2019.
Lenovo, Motorola Mobility, "PHR for NR CA" 3GPP TSG-RAN WG2 Meeting #99bis, R2-1711032, Prague, Czech Republic, Oct. 9-13, 2017, 4 pages.
HiSilicon Huawei, "PHR reporting in different TTI lengths", 3GPP TSG-RAN WG2 Meeting #99, R2-1709265, Berlin Germany, Aug. 21-25, 2017.
Lenovo, Motorola Mobility, "PHR for NR CA", 3GPP TSG-RAN WG2 #100, (Nov. 27-Dec. 1, 2017), R2-1712915, 3 pages.
EPO Extended European Search Report for corresponding EP Application No. 18899064.2; dated Sep. 13, 2021.

* cited by examiner

METHOD FOR REPORTING POWER HEADROOM, METHOD FOR RECEIVING POWER HEADROOM, USER EQUIPMENT, BASE STATION, MEDIUM AND SYSTEM

CROSS-REFERENCE TO RELATED APPLICATIONS

The present application is the national phase of International Application No. PCT/CN2018/124137, filed on Dec. 27, 2018, which claims priority to Chinese patent application No. 201810033669.9, filed on Jan. 12, 2018, and entitled "METHOD FOR REPORTING POWER HEADROOM, METHOD FOR RECEIVING POWER HEADROOM, USER EQUIPMENT, BASE STATION, MEDIUM AND SYSTEM", and the entire disclosure of which is incorporated herein by reference. TECHNICAL FIELD The present disclosure generally relates to communication field, and more particularly, to a method for reporting power headroom, a method for receiving power headroom, a user equipment, a base station, a medium and a system.

BACKGROUND

In a Long Term Evolution (LTE) system and a New Radio (NR) system, a User Equipment (UE) needs to transmit a Power Headroom Report (PHR) to a base station. The PHR includes parameters such as power headroom, a maximum transmission power and a cell identifier, which are used to indicate estimated information of used and remaining power of the UE. The base station allocates bandwidth resources and modulation orders for the UE to transmit data based on the PHR.

In existing techniques, when the base station configures "multiple PHRs" for the UE, the UE is required to package power headroom of all uplink carriers that have uplink data transmission at a reporting time of PHRs to one PHR to be reported to the base station.

The NR system supports different subcarrier spacing, such as 15 KHz, 30 KHz and 60 KHz. When the subcarrier spacing corresponding to different carriers is not the same, a time slot of one carrier may be overlapped with multiple time slots of another carrier, which makes it impossible to select a time slot in the overlapped time slots for power headroom reporting. As a result, the base station is unable to accurately learn the power headroom of the UE, thereby affecting bandwidth resource allocation of the base station and affecting service quality of the network.

SUMMARY

By embodiments of the present disclosure, when time slots corresponding to different carriers are overlapped, power headroom may still be accurately reported to the base station.

In an embodiment of the present disclosure, a method for reporting power headroom is provided, including: determining a first carrier and a first time slot corresponding to the first carrier for transmitting a PHR; acquiring a first time slot group corresponding to at least one other carrier, wherein the first time slot group includes N time slots, uplink data transmission is performed in at least one of the N time slots, N is a positive integer, and the first time slot includes the first time slot group in a time domain; generating the PHR based on power headroom corresponding to the first time slot and power headroom corresponding to the first time slot group; and reporting the PHR to a base station using the first time slot.

Optionally, the power headroom corresponding to the first time slot group includes power headroom corresponding to one or more time slots of the at least one of the N time slots in which the uplink data transmission is performed.

Optionally, generating the PHR based on power headroom corresponding to the first time slot and power headroom corresponding to the first time slot group includes: selecting one of the at least one of the N time slots in which the uplink data transmission is performed as a reference time slot; and generating the PHR based on the power headroom corresponding to the first time slot and the power headroom corresponding to the reference time slot.

Optionally, selecting one of the at least one of the N time slots in which the uplink data transmission is performed as the reference time slot includes: receiving signaling from the base station, where the signaling includes an identifier of the reference time slot in the first time slot group; and determining the reference time slot based on the identifier.

Optionally, the signaling is Radio Resource Control (RRC) signaling or physical layer control signaling.

Optionally, reporting the PHR to the base station using the first time slot includes: packaging the PHR as a Media Access Control (MAC) layer Control Element (CE), and transmitting the MAC layer CE to the base station using the first time slot.

Optionally, packaging the PHR as the MAC layer CE includes: indicating one or more slot numbers of the one or more time slots used to generate the PHR in the first slot group using one or more bits reserved in a subheader of the MAC layer CE; and sequentially packaging power headroom corresponding to the one or more slot numbers into a payload of the MAC layer CE.

In an embodiment of the present disclosure, a method for receiving power headroom is provided, including: transmitting signaling to a UE, where the signaling includes an identifier of a reference time slot in a first time slot group; and receiving a PHR from the UE.

In an embodiment of the present disclosure, a UE is provided, including: a determining circuitry configured to determine a first carrier and a first time slot corresponding to the first carrier for transmitting a PHR; an acquiring circuitry configured to acquire a first time slot group corresponding to at least one other carrier, wherein the first time slot group includes N time slots, uplink data transmission is performed in at least one of the N time slots, N is a positive integer, and the first time slot includes the first time slot group in a time domain; a generating circuitry configured to generate the PHR based on power headroom corresponding to the first time slot and power headroom corresponding to the first time slot group; and a reporting circuitry configured to report the PHR to a base station using the first time slot.

Optionally, the power headroom corresponding to the first time slot group includes power headroom corresponding to one or more time slots of the at least one of the N time slots in which the uplink data transmission is performed.

Optionally, the generating circuitry includes: a selecting sub-circuitry configured to select one of the at least one of the N time slots in which the uplink data transmission is performed as a reference time slot; and a generating sub-circuitry configured to generate the PHR based on the power headroom corresponding to the first time slot and the power headroom corresponding to the reference time slot.

Optionally, selecting one of the at least one of the N time slots in which the uplink data transmission is performed as the reference time slot includes: a receiving circuitry configured to receive signaling from the base station, where the signaling includes an identifier of the reference time slot in the first time slot group; and a selecting circuitry configured to determine the reference time slot based on the identifier.

Optionally, the signaling is RRC signaling or physical layer control signaling.

Optionally, the reporting circuitry includes: a packaging sub-circuitry configured to package the PHR as a MAC layer CE; and a reporting sub-circuitry configured to transmit the MAC layer CE to the base station using the first time slot.

Optionally, the packaging sub-circuitry is configured to: indicate one or more slot numbers of the one or more time slots used to generate the PHR in the first slot group using one or more bits reserved in a subheader of the MAC layer CE; and sequentially package power headroom corresponding to the one or more slot numbers into a payload of the MAC layer CE.

In an embodiment of the present disclosure, a base station is provided, including: a transmitting circuitry configured to transmit signaling to a UE, where the signaling includes an identifier of a reference time slot in a first time slot group; and a receiving circuitry configured to receive a PHR from the UE.

In an embodiment of the present disclosure, a computer readable storage medium having computer instructions stored therein is provided, where once the computer instructions are executed, the above method for reporting power headroom or the above method for receiving power headroom is performed.

In an embodiment of the present disclosure, a communication system including a memory and a processor is provided, where the memory has computer instructions stored therein, and once the processor executes the computer instructions, the above method for reporting power headroom or the above method for receiving power headroom is performed.

Embodiments of the present disclosure may provide following advantages. In embodiments of the present disclosure, time slots corresponding to different carriers are overlapped. The PHR is generated based on power headroom corresponding to the first time slot and power headroom corresponding to the first time slot group, and is reported to the base station using the first time slot. Power headroom corresponding to different carriers may be accurately reported to the base station, so that the base station may adjust transmission power of the UE rapidly to schedule the UE with high efficiency.

Further, by transmitting the signaling to the UE and receiving the PHR from the UE, the base station acquires the power headroom of the UE accurately, so as to schedule the UE with high efficiency.

DETAILED DESCRIPTION

The NR system supports different subcarrier spacing, such as 15 KHz, 30 KHz and 60 KHz. When the subcarrier spacing corresponding to different carriers is not the same, a time slot of one carrier may be overlapped with multiple time slots of another carrier, as shown in FIG. 1.

Figure 1:
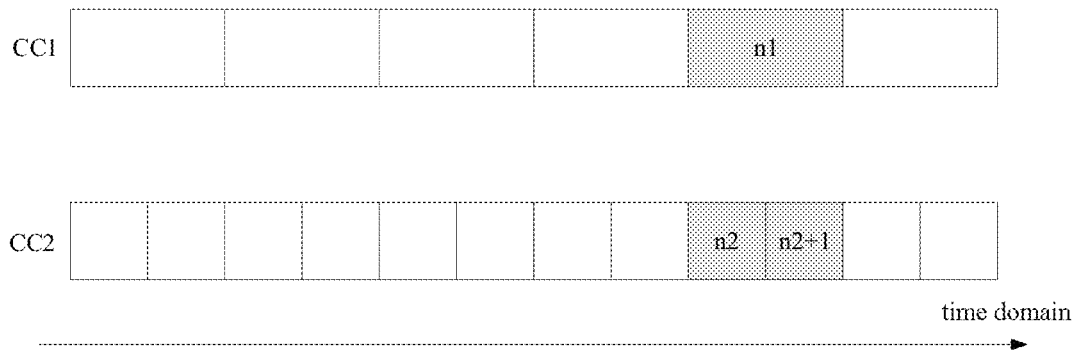
FIG. 1 schematically illustrates that time slots corresponding to different carriers overlap in existing techniques.

Referring to FIG. 1, the UE supports two carriers, Component Carrier 1 (CC1) and CC2 respectively. A time slot n1 corresponding to CC1 is overlapped with time slots n2 and n2+1 corresponding to CC2 in a time domain.

When a time slot of one carrier is overlapped with multiple time slots of another carrier, it is impossible to select a time slot in the overlapped time slots for power headroom reporting. As a result, the base station is unable to accurately learn the power headroom of the UE, thereby affecting bandwidth resource allocation of the base station and affecting service quality of the network.

In embodiments of the present disclosure, time slots corresponding to different carriers are overlapped. The PHR is generated based on power headroom corresponding to the first time slot and power headroom corresponding to the first time slot group, and is reported to the base station using the first time slot. Power headroom corresponding to different carriers may be accurately reported to the base station, so that the base station may adjust transmission power of the UE rapidly to schedule the UE with high efficiency.

In order to clarify the object, solutions and advantages of embodiments of the present disclosure, embodiments of present disclosure will be described clearly in detail in conjunction with accompanying drawings.

Figure 2:
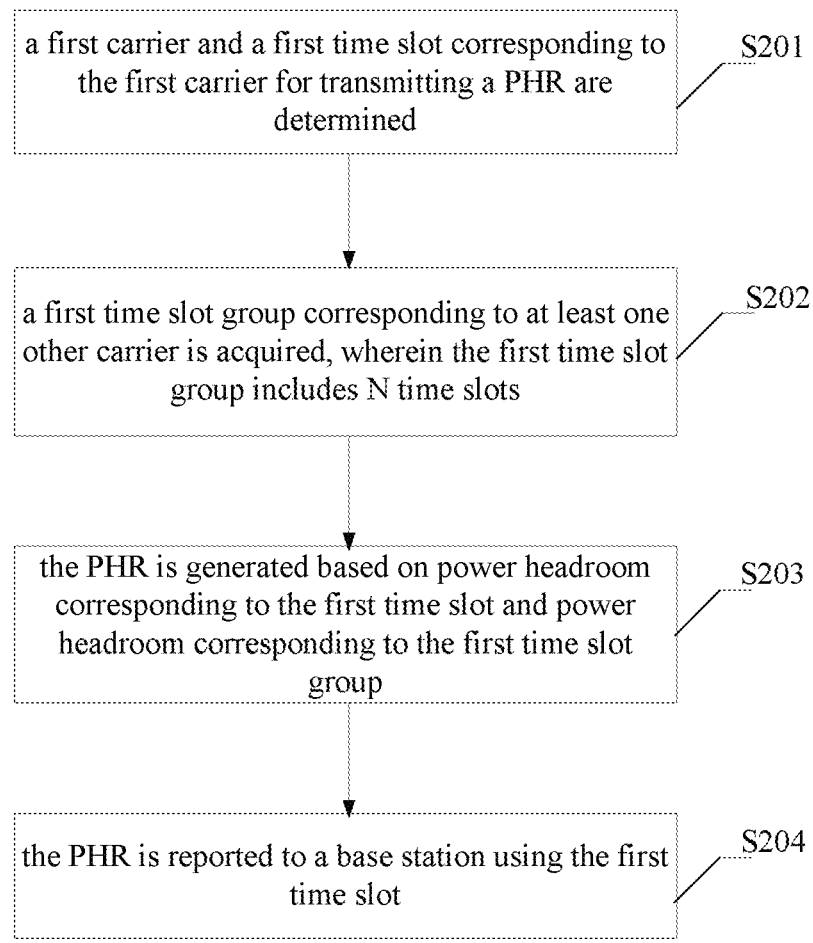
FIG. 2 schematically illustrates a flow chart of a method for reporting power headroom according to an embodiment.

FIG. 2 schematically illustrates a flow chart of a method for reporting power headroom according to an embodiment. Referring to FIG. 2, the method includes S201 to S204.

In S201, a first carrier and a first time slot corresponding to the first carrier for transmitting a PHR are determined.

In some embodiments, when triggering PHR reporting, the UE needs to calculate power headroom on a time slot corresponding to a carrier of reporting the PHR. The power headroom on the time slot corresponding to the carrier of reporting the PHR is power headroom corresponding to the time slot corresponding to the carrier of reporting the PHR.

For example, when the UE needs to report the power headroom on the first time slot corresponding to the first carrier, it is required to calculate the power headroom on the first time slot corresponding to the first carrier, and the power headroom on the first time slot corresponding to the first carrier is power headroom corresponding to the first time slot corresponding to the first carrier. Therefore, first, it is necessary to determine the first carrier and the corresponding first time slot for transmitting the PHR. Further, the UE needs to calculate the power headroom on the first time slot and package the power headroom to transmit.

In S202, a first time slot group corresponding to at least one other carrier is acquired, wherein the first time slot group includes N time slots, uplink data transmission is performed in at least one of the N time slots, N is a positive integer, and the first time slot includes the first time slot group in a time domain.

In some embodiments, when the base station configures "multiple PHRs" for the UE, the UE is required to package power headroom of all uplink carriers that have uplink data transmission at a reporting time of PHRs to one PHR to be reported to the base station. Uplink data transmission is performed in the uplink carriers. Therefore, the first time slot group corresponding to at least one other carrier needs to be acquired, wherein the first time slot group includes N time slots, uplink data transmission is performed in at least one of the N time slots, N is a positive integer, and the first time slot includes the first time slot group in the time domain.

In some embodiments, the first time slot group may include one time slot in which uplink data transmission is performed, or two or more time slots in which uplink data transmission is performed.

In some embodiments, the first time slot is completely overlapped with the first time slot group in the time domain.

In S203, the PHR is generated based on power headroom corresponding to the first time slot and power headroom corresponding to the first time slot group.

In some embodiments, the power headroom corresponding to the first time slot group may be power headroom corresponding to one time slot in the first time slot group in which the uplink data transmission is performed, or power headroom corresponding to multiple (i.e., two or more) time slots in the first time slot group in which the uplink data transmission is performed.

In some embodiments, one of the at least one of the N time slots (i.e., one time slot in the first time slot group) in which the uplink data transmission is performed is selected as a reference time slot, and the PHR is generated based on the power headroom corresponding to the first time slot and the power headroom corresponding to the reference time slot.

In some embodiments, the reference time slot may be determined based on signaling received from the base station.

In some embodiments, signaling is received from the base station, where the signaling includes an identifier of the reference time slot in the first time slot group, and the reference time slot is determined based on the identifier.

In some embodiments, the signaling is RRC signaling or physical layer control signaling.

In some embodiments, the power headroom is calculated according to descriptions in section 7.7.1 or 7.7.2 of 3GPP TS38.213. Power headroom Type 1 is calculated as follows, $$PH_{type1,f,c}(i,j,q_d,l)=P_{CMAX,f,c}(i)-\{P_{O\_PUSCH,f,c}(j)+10\log_{10}(2^\mu \cdot M_{RB,f,c}^{PUSCH}(i))+\alpha_{f,c}(j) \cdot PL_{f,c}(q_d)+\Delta_{TF,f,c}(i)+f_{f,c}(i,l)\} \text{ [dB]},$$

where definitions of $P_{CMAX,f,c}(i)$, $P_{O\_PCSCR,f,c}(j)$, $M_{RB,f,c}^{PUS}$$_{CH}(i)$, $\alpha_{f,c}(j)$, $PL_{f,c}(q_d)$, $\Delta_{TF,f,c}(i)$ and $f_{f,c}(i,l)$ can be found in section 7.1.1 of 3GPP TS38.213, and are not described in detail here.

When the UE transmits a Sounding Reference Signal (SRS), power headroom Type 2 is calculated as follows, $$PH_{type2,f,c}(i,q_s,l)=P_{CMAX,f,c}(i)-\{P_{O\_PUSCH,f,c}(q_s)+10\log_{10}(2^\mu \cdot M_{SRS,f,c}(i))+\alpha_{SRS,f,c}(q_s) \cdot PL_{f,c}(q_s)+h_{f,c}(i,l)\} \text{ [dB]},$$

where definitions of $P_{CMAX,f,c}(i)$, $P_{O\_PCSCR,f,c}(q_s)$, $M_{SRS,f,c}(i)$, $\alpha_{SRS,f,c}(q_s)$, $PL_{f,c}(q_s)$, and $h_{f,c}(i,l)$ can be found in section 7.3.1 of 3GPP TS38.213, and are not described in detail here.

When the UE does not transmit an SRS, power headroom Type 2 is calculated as follows, $$PH_{type2,f,c}(i,q_s,l)=\tilde{P}_{CMAX,f,c}(i)-\{P_{O\_SRS,f,c}(q_{s0})+\alpha_{SRS,f,c}(q_{s0})+PL_{f,c}(q_{s0})+h_{f,c}(i,l)\} \text{ [dB]},$$

where definitions of $\alpha_{SRS,f,c}(q_s)$, $PL_{f,c}(q_s)$, and $h_{f,c}(i,l)$ can be found in section 7.3.1 of 3GPP TS38.213, $q_{s0}$ is an SRS resource configured by a high layer, and definition of $\tilde{P}_{CMAX,f,c}(i)$ can be found in section 7.7.2 of 3GPP TS38.213, which are not described in detail here.

In S204, the PHR is reported to a base station using the first time slot.

In some embodiments, the PHR may be packaged as a MAC layer CE, and the MAC layer CE may be transmitted to the base station using the first time slot.

In some embodiments, one or more slot numbers of the one or more time slots used to generate the PHR in the first slot group are indicated using one or more bits reserved in a subheader of the MAC layer CE, and power headroom corresponding to the one or more slot numbers is sequentially packaged into a payload of the MAC layer CE.

In some embodiments, the number of the one or more time slots used to generate the PHR in the first slot group is indicated using a bit reserved in a subheader of the MAC layer CE, and power headroom corresponding to one or more slot numbers is sequentially packaged into a payload of the MAC layer CE.

By the above embodiments, aiming to a scenario where time slots corresponding to different carriers are overlapped, the PHR is generated based on power headroom corresponding to the first time slot and power headroom corresponding to the first time slot group, and is reported to the base station using the first time slot. Power headroom corresponding to different carriers may be accurately reported to the base station, so that the base station may adjust transmission power of the UE rapidly to schedule the UE with high efficiency.

Figure 3:
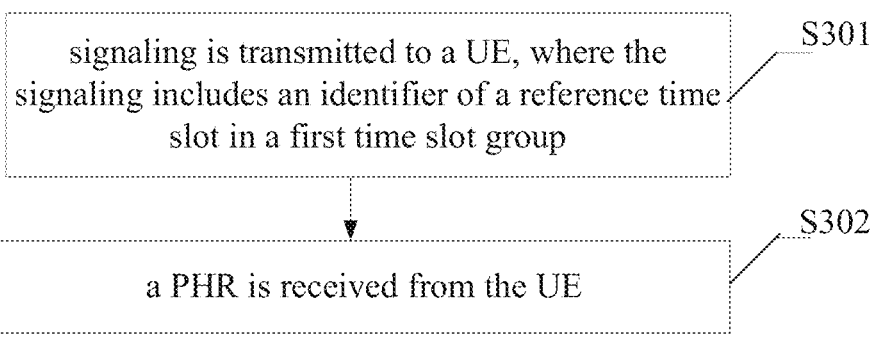
FIG. 3 schematically illustrates a flow chart of a method for receiving power headroom according to an embodiment.

FIG. 3 schematically illustrates a flow chart of a method for receiving power headroom according to an embodiment. Referring to FIG. 3, the method includes S301 and S302.

In S301, signaling is transmitted to a UE, where the signaling includes an identifier of a reference time slot in a first time slot group.

In some embodiments, the signaling is RRC signaling or physical layer control signaling.

In S302, a PHR is received from the UE.

In the above embodiments, by transmitting the signaling to the UE and receiving the PHR from the UE, the base station acquires the power headroom of the UE accurately, so as to schedule the UE with high efficiency.

Figure 4:
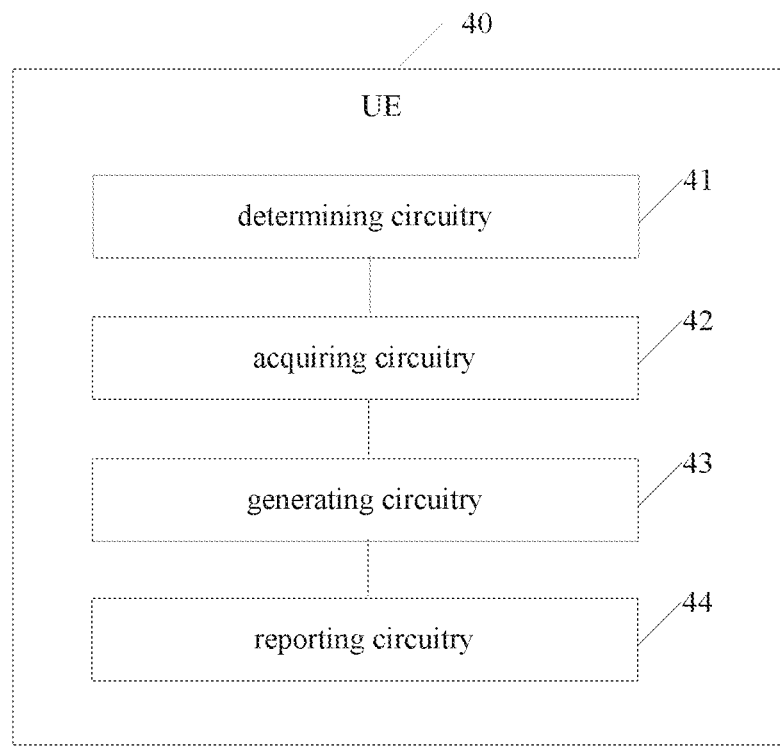
FIG. 4 schematically illustrates a structural diagram of a UE according to an embodiment.

To make those skilled in the art better understand and implement solutions of the present disclosure, embodiments of the present disclosure also provide a UE for implementing the above method for reporting power headroom. FIG. 4 schematically illustrates a structural diagram of the UE.

Referring to FIG. 4, the UE 40 includes a determining circuitry 41, an acquiring circuitry 42, a generating circuitry 43 and a reporting circuitry 44.

The determining circuitry 41 is configured to determine a first carrier and a first time slot corresponding to the first carrier for transmitting a PHR.

The acquiring circuitry 42 is configured to acquire a first time slot group corresponding to at least one other carrier, wherein the first time slot group includes N time slots, uplink data transmission is performed in at least one of the N time slots, N is a positive integer, and the first time slot includes the first time slot group in a time domain.

The generating circuitry 43 is configured to generate the PHR based on power headroom corresponding to the first time slot and power headroom corresponding to the first time slot group.

The reporting circuitry 44 is configured to report the PHR to a base station using the first time slot.

In some embodiments, the power headroom corresponding to the first time slot group includes power headroom corresponding to one or more time slots of the at least one of the N time slots in which the uplink data transmission is performed.

In some embodiments, the generating circuitry 43 includes: a selecting sub-circuitry (not shown) configured to select one of the at least one of the N time slots in which the uplink data transmission is performed as a reference time slot; and a generating sub-circuitry (not shown) configured to generate the PHR based on the power headroom corresponding to the first time slot and the power headroom corresponding to the reference time slot.

In some embodiments, the selecting sub-circuitry includes: a receiving circuitry (not shown) configured to receive signaling from the base station, where the signaling includes an identifier of the reference time slot in the first time slot group; and a selecting circuitry (not shown) configured to determine the reference time slot based on the identifier.

In some embodiments, the signaling is RRC signaling or physical layer control signaling.

In some embodiments, the reporting circuitry 44 includes: a packaging sub-circuitry (not shown) configured to package the PHR as a MAC layer CE; and a reporting sub-circuitry (not shown) configured to transmit the MAC layer CE to the base station using the first time slot.

In some embodiments, the packaging sub-circuitry is configured to: indicate one or more slot numbers of the one or more time slots used to generate the PHR in the first slot group using one or more bits reserved in a subheader of the MAC layer CE; and sequentially package power headroom corresponding to the one or more slot numbers into a payload of the MAC layer CE.

Operation procedures and principles of the UE 40 can be referred to the descriptions of the method for reporting power headroom provided in the above embodiments, and are not described in detail here.

Figure 5:
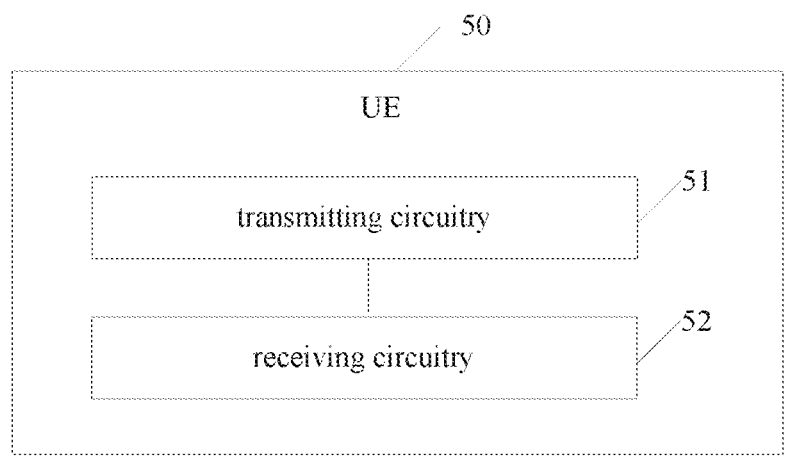
FIG. 5 schematically illustrates a structural diagram of a base station according to an embodiment.

To make those skilled in the art better understand and implement solutions of the present disclosure, embodiments of the present disclosure also provide a base station for implementing the above method for receiving power headroom. FIG. 5 schematically illustrates a structural diagram of the base station.

Referring to FIG. 5, the base station 50 includes a transmitting circuitry 51 and a receiving circuitry 52.

The transmitting circuitry 51 is configured to transmit signaling to a UE, where the signaling includes an identifier of a reference time slot in a first time slot group.

In some embodiments, the signaling is RRC signaling or physical layer control signaling.

The receiving circuitry 52 is configured to receive a PHR from the UE.

Operation procedures and principles of the base station 50 can be referred to the descriptions of the method for receiving power headroom provided in the above embodiments, and are not described in detail here.

In an embodiment of the present disclosure, a computer readable storage medium having computer instructions stored therein is provided, where once the computer instructions are executed, the method for reporting power headroom or the method for receiving power headroom is performed. The computer readable storage medium is a non-volatile or non-transient storage medium.

In an embodiment of the present disclosure, a communication system including a memory and a processor is provided, where the memory has computer instructions stored therein, and once the processor executes the computer instructions, the method for reporting power headroom or the method for receiving power headroom is performed.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for reporting power headroom, comprising:
   determining a first carrier and a first time slot corresponding to the first carrier for transmitting a power headroom report (PHR);
   acquiring a first time slot group corresponding to at least one other carrier, wherein the first time slot group comprises N time slots, uplink data transmission is performed in at least one of the N time slots, N is a positive integer, and the first time slot comprises the first time slot group in a time domain;
   generating the PHR based on power headroom corresponding to the first time slot and power headroom corresponding to one or more time slots of the at least one of the N time slots in which the uplink data transmission is performed; and
   reporting the PHR to a base station using the first time slot,
   wherein said reporting the PHR to the base station using the first time slot comprises:
      indicating one or more slot numbers of the one or more time slots used to generate the PHR in the first slot group using one or more bits reserved in a subheader of a Media Access Control (MAC) layer control element;
      sequentially packaging power headroom corresponding to the one or more slot numbers into a payload of the MAC layer control element; and
      transmitting the MAC layer control element to the base station using the first time slot.

2. The method according to claim 1, wherein generating the PHR based on power headroom corresponding to the first time slot and power headroom corresponding to the first time slot group comprises:
   selecting one of the at least one of the N time slots in which the uplink data transmission is performed as a reference time slot; and
   generating the PHR based on the power headroom corresponding to the first time slot and the power headroom corresponding to the reference time slot.

3. The method according to claim 2, wherein selecting one of the at least one of the N time slots in which the uplink data transmission is performed as the reference time slot comprises:
   receiving signaling from the base station, where the signaling comprises an identifier of the reference time slot in the first time slot group; and
   determining the reference time slot based on the identifier.

4. The method according to claim 3, wherein the signaling is Radio Resource Control (RRC) signaling or physical layer control signaling.

5. A User Equipment (UE), comprising:
   a determining circuitry configured to determine a first carrier and a first time slot corresponding to the first carrier for transmitting a power headroom report (PHR);
   an acquiring circuitry configured to acquire a first time slot group corresponding to at least one other carrier, wherein the first time slot group comprises N time slots, uplink data transmission is performed in at least one of the N time slots, N is a positive integer, and the first time slot comprises the first time slot group in a time domain;

a generating circuitry configured to generate the PHR based on power headroom corresponding to the first time slot and power headroom corresponding to one or more time slots of the at least one of the N time slots in which the uplink data transmission is performed; and a reporting circuitry configured to report the PHR to a base station using the first time slot, wherein the reporting circuitry (44) comprises:

a packaging sub-circuitry configured to: indicate one or more slot numbers of the one or more time slots used to generate the PHR in the first slot group using one or more bits reserved in a subheader of a Media Access Control (MAC) layer control element; and sequentially package power headroom corresponding to the one or more slot numbers into a payload of the MAC layer control element; and a reporting sub-circuitry configured to transmit the MAC layer control element to the base station using the first time slot.

6. The UE according to claim 5, wherein the generating circuitry comprises:

a selecting sub-circuitry configured to select one of the at least one of the N time slots in which the uplink data transmission is performed as a reference time slot; and a generating sub-circuitry configured to generate the PHR based on the power headroom corresponding to the first time slot and the power headroom corresponding to the reference time slot.

7. The UE according to claim 6, wherein selecting one of the at least one of the N time slots in which the uplink data transmission is performed as the reference time slot comprises:

a receiving circuitry configured to receive signaling from the base station, where the signaling comprises an identifier of the reference time slot in the first time slot group; and a selecting circuitry configured to determine the reference time slot based on the identifier.

8. The UE according to claim 7, wherein the signaling is Radio Resource Control (RRC) signaling or physical layer control signaling.

9. A non-transitory computer readable storage medium having computer instructions stored therein, wherein once the computer instructions are executed, the method according to claim 1 is performed.

10. A communication system comprising a memory and a processor, wherein the memory has computer instructions stored therein, and once the processor executes the computer instructions, the method according to claim 1 is performed.

* * * * *